US012636779B2

(12) United States Patent
Monetti et al.

(10) Patent No.: US 12,636,779 B2
(45) Date of Patent: May 26, 2026

(54) CONTROLLING A TELEROBOT

(71) Applicant: KUKA Deutschland Gmbh, Augsburg (DE)

(72) Inventors: Giuseppe Monetti, Augsburg (DE); Juan David Munoz Osorio, Augsburg (DE)

(73) Assignee: KUKA Deutschland GmbH (DE)

( * ) Notice: Subject to any disclaimer, the term of this patent is extended or adjusted under 35 U.S.C. 154(b) by 45 days.

(21) Appl. No.: 18/730,573

(22) PCT Filed: Jan. 17, 2023

(86) PCT No.: PCT/EP2023/050938
§ 371 (c)(1),
(2) Date: Jul. 19, 2024

(87) PCT Pub. No.: WO2023/143953
PCT Pub. Date: Aug. 3, 2023

(65) Prior Publication Data
US 2025/0100136 A1     Mar. 27, 2025

(30) Foreign Application Priority Data
Jan. 28, 2022     (DE) ..................... 10 2022 200 943.6

(51) Int. Cl.
*B25J 9/16*               (2006.01)
(52) U.S. Cl.
CPC ........... *B25J 9/1633* (2013.01); *B25J 9/1689* (2013.01)
(58) Field of Classification Search
CPC .................. B25J 9/1633; B25J 9/1689; G05B 2219/39346; G05B 2219/40194; G05B 2219/40184
See application file for complete search history.

(56) References Cited

U.S. PATENT DOCUMENTS

2010/0256812 A1* 10/2010 Tsusaka ................... B25J 5/007
                                                              700/254
2015/0202775 A1      7/2015 Inazumi

FOREIGN PATENT DOCUMENTS

DE             10226853 B3     2/2004
DE        102008041867 B4     3/2010
               (Continued)

OTHER PUBLICATIONS

Youssef et al (Bilateral Teleoperation With Adaptive Impedance Control for Contact Tasks) (Year: 2021).*
(Continued)

*Primary Examiner* — Dylan M Katz
(74) *Attorney, Agent, or Firm* — Dorton & Willis, LLP

(57)          ABSTRACT

A method for controlling a telerobot using an input device having a movable control includes detecting an adjustment of the control and an external load acting on the telerobot; determining a target adjustment of a telerobot reference fixed to the robot, based on the detected adjustment of the control; detecting an actual adjustment of the telerobot reference; and controlling drives of the telerobot based on a difference between the actual adjustment and target adjustment. A first operating mode is implemented if the detected load falls in a first range, and a second operating mode is implemented if the detected load falls in a second range. The drives of the telerobot are controlled in the first operating mode such that drive loads of the drives increase with an increase in a one- or multi-dimensional component of the difference in order to reduce the component; and, the drives of the telerobot are controlled in the second operating mode such that drive loads of the drives likewise increase with the same increase in this component of the difference in order to reduce the component, but less than in the first operating mode.

12 Claims, 1 Drawing Sheet

(56)            References Cited

FOREIGN PATENT DOCUMENTS

| | | | |
|---|---|---|---|
| DE | 102016014989 | B4 | 6/2018 |
| DE | 102019108390 | B3 | 8/2020 |
| DE | 102019118897 | B3 | 10/2020 |
| DE | 102020107612 | B3 | 9/2021 |
| GB | 2593739 | A | 10/2021 |

OTHER PUBLICATIONS

Hannaford, Blake; Ryu, Jee-Hwan, Time-domain passivity control of haptic interfaces, IEEE transactions on Robotics and Automation, 2002, vol. 18, No. 1, pp. 1-10.

Emmanuel Nuno, Luis Basañez, Roméo Ortega, Passivity-based control for bilateral teleoperation: A tutorial. Automatica, Elsevier, 2011, 47 (3), pp. 485-495.

Ryu, Jee-Hwan, Artigas, Jordi Preusche, Carsten, A passive bilateral control scheme for a teleoperator with time- varying communication delay, Mechatronics (2010), 20 (7), pp. 812-823.

German Patent Office; Search report in related German Patent Application No. 10 2022 200 943.6 dated Oct. 4, 2022; 6 pages.

European Patent Office; Search Report in related International Patent Application No. PCT/EP2023/050938 dated May 17, 2023; 3 pages.

Michel Youssef et al. "Bilateral Teleoperation With Adaptive Impedance Control for Contact Tasks"; IEEE Robotics and Automation Letters IEEE; vol. 6, No. 3, Mar. 17, 2021 (Mar. 17, 2021), pp. 5429-5436; DOI: 10.1109/LRA.2021.3066974; XP011854096; the whole document.

* cited by examiner

S10

S20

S30

S40

CONTROLLING A TELEROBOT

CROSS-REFERENCE TO RELATED APPLICATIONS

This application is a national phase application under 35 U.S.C. § 371 of International Patent Application No. PCT/EP2023/050938, filed Jan. 17, 2023 (pending), which claims the benefit of priority to German Patent Application No. DE 10 2022 200 943.6, filed Jan. 28, 2022, the disclosures of which are incorporated by reference herein in their entirety.

TECHNICAL FIELD

The present invention relates to a method and a system for controlling a telerobot and to a computer program or computer program product for carrying out the method.

BACKGROUND

According to internal company practice, telerobots are controlled by means of an input device that comprises a movable control means, wherein adjustments of the control means are converted by control technology into drive loads of the drives of the telerobot.

In this respect, a possible variant is to detect an adjustment of the control means, determine a target adjustment $x_d$ of a telerobot reference fixed to the robot, for example its TCP, and control the drives of the telerobot in such a way that drive loads $\tau$ of the drives increase with an increase in a difference $\tilde{x} = x - x_d$ between actual adjustment $x$ and target adjustment $x_d$ of the reference fixed to the robot, in order to reduce this difference, for example in the simple form $\tau = J^T$ (q). $(K_d \cdot \tilde{x})$ with the transposed Jacobian matrix $J^T$, which links joint velocities q and velocities $\dot{x}$ of the reference fixed to the robot $$\left( J^T = \left( \frac{\partial \dot{x}}{\partial \dot{q}} \right)^T \right),$$

and the stiffness matrix $K_d$.

If the drive loads increase significantly with an increase in the difference or if the stiffness is high in the simple example above, the telerobot can be (tele)controlled (more) precisely. On the other hand, this can be disadvantageous, for example in the case of a contact with the surroundings, in which the ability to yield (more) is desirable, in particular in order to avoid damage.

SUMMARY

An object of an embodiment of the present invention is to improve controlling a telerobot.

This object is achieved by a method, a system, and a computer program or computer program product for carrying out a method as described herein.

According to an embodiment of the present invention, a method for controlling a telerobot by means of an input device that comprises a movable control means comprises the following steps, which are preferably repeated multiple times:

detecting an adjustment of the control means and an external load acting on the telerobot;

determining a target adjustment of a telerobot reference fixed to the robot, based on the detected adjustment of the control means;

detecting an actual adjustment of the reference fixed to the robot; and controlling drives of the telerobot based on a difference between actual adjustment and target adjustment.

According to an embodiment of the present invention, a first operating mode is implemented if the detected load is in a first range, and a second operating mode is implemented if the detected load is in a second range.

According to an embodiment of the present invention, the drives of the telerobot are controlled in the first operating mode in such a way, or with the proviso, that drive loads of the drives increase with or as a result of an increase in a one- or multi-dimensional component of the difference between actual adjustment and target adjustment in order to reduce this component of the difference, and in the second operating mode in such a way, or with the proviso, that drive loads of the drives likewise increase with or as a result of the same increase in this component of the difference between actual adjustment and target adjustment in order to reduce this component of the difference, however they increase less (strongly) than in the first operating mode.

As a result, in an embodiment, if a corresponding situation, in one embodiment a contact of the telerobot with the surroundings, is determined on the basis of the detected load, the telerobot can be switched or controlled by control technology (more) smoothly in one or more directions or degrees of freedom. In this way, in an embodiment, loads on the robot and/or the surroundings can be advantageously reduced. Accordingly, in an embodiment, the telerobot can be switched or controlled by control technology (more) stiffly if the corresponding situation, in particular contact of the telerobot with the surroundings, is not determined on the basis of the detected load. In this way, in an embodiment, the telerobot can be controlled advantageously, in particular (more) precisely.

In an embodiment, the telerobot comprises a ((tele) robot) arm with at least three, in particular at least six, in one embodiment at least seven, joints or axes of motion. In an embodiment, the reference fixed to the robot is stationary with respect to a distal end flange of the telerobot (arm); in an embodiment, the reference fixed to the robot comprises an end effector or TCP of the telerobot (arm), in particular can be an end effector or TCP of the telerobot (arm).

In an embodiment, the control means is spatially spaced apart from the telerobot and/or a (robot) controller of the telerobot. In an embodiment, the input device, in particular an input device controller, is connected to the telerobot and/or a (robot) controller of the telerobot by signals, in one development by a wired connection, which in an embodiment can increase safety, and in another development wirelessly, which in an embodiment can increase the flexibility and/or range. In an embodiment, the control means is mounted movably, in particular via one or more joints, on a base of the input device, wherein in an embodiment a pose $x_M$ of the control means relative to the base of the input device and/or a pose change, in particular velocity $v_M$, of the control means, relative to the base of the input device is detected, preferably by sensors, as an adjustment of the control means.

An adjustment in the sense of the present invention in an embodiment generally comprises a pose and/or an, in particular temporal, pose change, in particular first and/or higher time derivative of a pose, in one embodiment a velocity, in particular can be a pose and/or, in particular temporal, pose change, in particular first and/or higher time derivative, in one embodiment velocity. A pose in the sense of the present invention in an embodiment comprises a one-, two-, or three-dimensional position and/or a one-, two-, or three-dimensional orientation. Accordingly, for a more compact representation, a pose that always (also) constitutes an adjustment compared to an initial pose or reference pose is in particular referred to as an adjustment in a generalized manner.

The actual adjustment, i.e., in particular an actual pose and/or actual velocity, of the reference fixed to the robot is detected in an embodiment by sensors, in a development, based on detected positions and/or position changes of joints or drives of the telerobot.

In an embodiment, a load in the sense of the present invention can comprise, in particular be, a force in one or more directions and/or a torque, in particular (each) in one or more directions, in particular spatial directions. In an embodiment, an external load, acting on the telerobot, in the sense of the present invention does not comprise any drive loads of the drives of the telerobot and/or any self-weight-induced loads, in particular weight forces and/or inertial forces or torques resulting therefrom, of the telerobot.

The external load acting on the telerobot is detected in an embodiment by sensors, in a development by means of a single- or multi-axis load sensor, i.e., in particular a force and/or torque sensor, on an end effector or end flange of the telerobot, and/or based on detected loads on joints and/or drives of the telerobot, preferably by means of a mathematical model of the telerobot.

Controlling in the sense of the present invention preferably comprises regulating.

In an embodiment, the drives of the telerobot are controlled in the first operating mode in such a way, or with the proviso, that drive loads of the drives increase with or as a result of an increase in at least one other one- or multi-dimensional component of the difference between actual adjustment and target adjustment in order to (likewise) reduce this other component of the difference, and in the second operating mode in such a way, or with the proviso, that drive loads of the drives increase with the same increase in this other component of the difference between actual adjustment and target adjustment (just) as in the first operating mode in order to reduce this other component.

As a result, in an embodiment, the telerobot can be switched or controlled by control technology in the direction (s) or degree(s) of freedom of the one component of the difference between actual adjustment and target adjustment (more) smoothly in the first operating mode or (more) stiffly in the second operating mode, and loads on the robot and/or the surroundings can in this way be advantageously reduced, wherein the telerobot can simultaneously be controlled by control technology in the direction(s) or degree(s) of freedom of the other component of the difference between actual adjustment and target adjustment equally stiffly in the first and second operating modes and can in this way be controlled advantageously, in particular (more) precisely.

In an embodiment, the detected external load acting on the telerobot acts in the direction of the one component and, in a development, not in the direction of the other component; in an embodiment, the one and, if applicable, the other component are selected or defined accordingly. In a development, the one component of the difference is therefore the one component of the difference in the direction of the external load and the other component of the difference is a component of the difference that is complementary thereto, for example a component that is perpendicular to the one component; in an embodiment, the one and, if applicable, the other component are selected or defined accordingly. If the stiffness of a virtual spring is reduced in the second operating mode compared to the first operating mode in an embodiment, the stiffness of the virtual spring is preferably reduced in the second operating mode compared to the first operating mode only in directions of the external load in a development and is not reduced in at least one direction perpendicular thereto in a development.

In an embodiment, a component is understood in the usual way to be a portion in a translational direction and/or a portion in a rotational direction. Accordingly, in an embodiment, the one component of the difference is a (translational) component of a translational difference between one-, two-, or three-dimensional actual adjustment and target adjustment, in particular position or displacement, and/or a (rotational) component of a rotational difference between one-, two-, or three-dimensional actual adjustment and target adjustment, in particular orientation or rotation.

In an embodiment, the direction of the one component changes with or as a result of (a change in) the direction of the detected load, and/or the direction of the one component coincides with the direction of the detected load.

For example, for clarification, if $\Delta=[\Delta_x \, \Delta_y \, \Delta_z]^T$ denotes the translational difference between target adjustment and actual adjustment of the reference fixed to the robot, and the external force acts (only) in the x-direction, the one component of the difference or the translational portion of the one component of the difference is $\Delta_x$ in an embodiment. Then, in an embodiment, the drives of the telerobot are controlled in the first and second operating modes in such a way that drive loads of the drives increase with an increase in $\Delta_x$ in order to reduce this component, however they increase less in the second operating mode than in the first operating mode. In a development, the drives of the telerobot are controlled in the first and second operating modes in such a way that drive loads of the drives increase with an increase in $\Delta_y$ in the second operating mode just as in the first operating mode in order to reduce this component. This can be implemented or realized in particular by a corresponding reduction of a stiffness of a virtual spring (only) in the x-direction. This applies analogously to a rotational component or a rotational portion of a component.

As a result, in an embodiment, the telerobot can be switched or controlled by control technology in the direction of the external load acting on the telerobot, in particular a contact load acting on the telerobot from the surroundings as a result of a contact of the telerobot with the surroundings, (more) smoothly in the first operating mode or (more) stiffly in the second operating mode, and loads on the robot and/or the surroundings can in this way be advantageously reduced, wherein the telerobot can simultaneously be controlled by control technology in the other or non-contact direction(s) or degree(s) of freedom equally (stiffly) in the first and second operating modes and can in this way be controlled advantageously, in particular (more) precisely.

Similarly, it may also be advantageous to control the drives of the telerobot in the first and second operating modes in such a way that drive loads of the drives increase with an increase in the detected external load in order to reduce the difference between target adjustment and actual adjustment of the reference fixed to the robot, however they increase less in the second operating mode than in the first operating mode, namely, regardless of the direction of the external load and/or in all (translational and/or rotational) directions.

In an embodiment, a reduced stiffness in a direction perpendicular to the direction of the external load and thus a reduced precision is deliberately accepted in order in an embodiment to realize a simple(r) and/or fast(er) implementation and/or to respond more flexibly in the event of contact with the surroundings.

In an embodiment, the detected load is in the first range if it falls below a lower limit value, and/or the detected load is in the second range if it exceeds an upper limit value, which in one development is equal to the lower limit value, in another development is greater than the lower limit value; in an embodiment, the first and second range are selected or defined accordingly, or the first and second operating mode are implemented accordingly.

As a result, in an embodiment, a contact can be determined advantageously, in particular simply, precisely and/or reliably, and, if necessary, a hysteresis can be provided.

In an embodiment, in particular in the increase in the drive loads with an increase in the one component of a difference between actual adjustment and target adjustment, a hysteresis between a transition from the first to the second operating mode and a transition from the second to the first operating mode is provided or implemented by control technology. In a development, switching takes place from the first and/or into the second operating mode when the detected load exceeds an upper limit value, and/or switching takes place from the second and/or into the first operating mode when the detected load falls below an, in particular smaller, lower limit value.

As a result, unwanted oscillations can be advantageously reduced or avoided in an embodiment.

In an embodiment, the drives are controlled in the first and second operating modes based on a virtual spring between an actual pose and a target pose of the reference fixed to the robot, wherein a stiffness of this virtual spring in at least one direction, in a development also or only in the direction of the detected external load, is reduced in the second operating mode compared to the first operating mode.

As a result, in an embodiment, the, preferably component-by-component, reduction of the increase in the drive loads of the drives in the second operating mode compared to the first operating mode can be implemented or realized particularly advantageously, in particular simply, robustly and/or in a manner adapted to the situation.

Additionally or alternatively, in an embodiment, the drives are also controlled in the first and second operating modes based on a mathematical model of the telerobot and/or based on a virtual damper between an actual pose change and a target pose change of the reference fixed to the robot.

In an embodiment, the mathematical model or the corresponding portions of the drive forces compensate for the dynamics and the weight of the telerobot, while the virtual damper reduces vibrations. In an embodiment, this makes it possible to (further) improve the control of the telerobot, in particular to operate or control the telerobot (more) simply, (more) precisely, (more) reliably and/or more safely.

Additionally or alternatively, the drives are controlled in an embodiment by means of an impedance regulation, in one development by means of a Cartesian impedance regulation, and/or passivity regulation, and in one development by means of a passivity regulation in the time domain.

In an embodiment, the (Cartesian) impedance regulation allows the telerobot to be operated or controlled particularly easily, precisely, reliably and/or safely.

Through the passivity regulation, in particular the passivity regulation in the time domain ("time domain passivity approach"), the telerobot in an embodiment can be operated or controlled particularly easily, precisely, reliably and/or safely. For further information, please refer to Hannaford, Blake; Ryu, Jee-Hwan, Time-domain passivity control of haptic interfaces, IEEE transactions on Robotics and Automation, 2002, vol. 18, no. 1, pp. 1-10; Emmanuel Nuno, Luis Basañez, Roméo Ortega, Passivity-based control for bilateral teleoperation: A tutorial. Automatica, Elsevier, 2011, 47 (3), pp. 485-495 and Ryu, Jee-Hwan, Artigas, Jordi Preusche, Carsten, A passive bilateral control scheme for a teleoperator with time-varying communication delay, Mechatronics (2010), 20 (7), pp. 812-823. Elsevier, the contents of which are fully incorporated into the present disclosure.

According to an embodiment of the present invention, a system for controlling a telerobot by means of an input device which comprises a movable control means is configured, in particular in terms of hardware and/or software, in particular in terms of programming, to implement a method described herein, and/or comprises:

means for determining a target adjustment of a telerobot reference fixed to the robot, based on a detected adjustment of the control means; and means for controlling drives of the telerobot based on a difference between a detected actual adjustment of the reference fixed to the robot and the determined target adjustment, which comprises:

means for implementing a first operating mode if a detected external load acting on the telerobot is in a first range; and means for implementing a second operating mode if the detected load is in a second range;

wherein the means for implementing a first operating mode comprises means for controlling the drives of the telerobot in the first operating mode in such a way that drive loads of the drives increase with an increase in a one- or multi-dimensional component of the difference between actual adjustment and target adjustment in order to reduce this component; and the means for implementing a second operating mode comprises means for controlling the drives of the telerobot in the second operating mode in such a way that drive loads of the drives likewise increase with the same increase in this component of the difference between actual adjustment and target adjustment in order to reduce this component, however they increase less than in the first operating mode.

In an embodiment, the system or its means comprises:

means for detecting an or the adjustment of the control means; and/or means for detecting an or the external load acting on the telerobot; and/or means for detecting an or the actual adjustment of the reference fixed to the robot.

In an embodiment, the means for implementing a first operating mode comprises means for controlling the drives of the telerobot in the first operating mode in such a way that drive loads of the drives increase with an increase in at least one other one- or multi-dimensional component of the difference between actual adjustment and target adjustment in order to reduce this other component; and the means for implementing a second operating mode comprises means for controlling the drives of the telerobot in the second operating mode in such a way that the drives of the telerobot are controlled in the second operating mode in such a way that drive loads of the drives increase with the same increase in this other component of the difference between actual adjustment and target adjustment just as in the first operating mode in order to reduce this other component.

In an embodiment, the means for implementing a first operating mode and the means for implementing a second operating mode comprise means for controlling the drives of the telerobot in the first and second operating modes, respectively, in such a way that the drives are controlled in the first and second operating modes based on a virtual spring between an actual pose and a target pose of the reference fixed to the robot, wherein a stiffness of this virtual spring in at least one direction, in particular also or only in the direction of the detected external load, is reduced in the second operating mode compared to the first operating mode.

In an embodiment, the means for implementing a first operating mode and the means for implementing a second operating mode comprise means for also controlling the drives of the telerobot in the first and second operating modes, respectively, based on a mathematical model of the telerobot and/or based on a virtual damper between an actual pose change and a target pose change of the reference fixed to the robot.

In an embodiment, the means for implementing a first operating mode and the means for implementing a second operating mode comprise means for controlling the drives of the telerobot in the first and second operating modes, respectively, by means of an impedance regulation and/or passivity regulation, in particular a Cartesian impedance regulation and/or passivity regulation in the time domain.

A system and/or a means in the sense of the present invention may be designed in hardware and/or in software, and in particular may comprise at least one, in particular digital, processing unit, in particular microprocessor unit (CPU), graphic card (GPU) or the like, which is preferably data-connected or signal-connected to a memory system and/or bus system, and/or one or multiple programs or program modules. The processing unit may be designed to process commands that are implemented as a program stored in a memory system, to detect input signals from a data bus and/or to output output signals to a data bus. A memory system may comprise one or more, in particular different, storage media, in particular optical, magnetic, solid-state, and/or other non-volatile media. The program may be designed in such a way that it embodies or is capable of carrying out the methods described herein, so that the processing unit can carry out the steps of such methods and thus, in particular, can operate the telerobot. In an embodiment, a computer program product may comprise, in particular be, a, in particular computer-readable and/or non-volatile, storage medium for storing a program or instructions or with a program stored thereon or with instructions stored thereon. In an embodiment, execution of said program or said instructions by a system or controller, in particular a computer or an arrangement of a plurality of computers, causes the system or controller, in particular the computer(s), to carry out a method described herein or one or more steps thereof, or the program or instructions are configured to do so.

In an embodiment, one or more, in particular all, steps of the method are implemented completely or partially automatically, in particular by the system or its means.

In an embodiment, the system comprises the telerobot.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figures 1, 2:
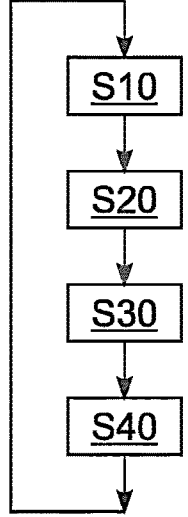
FIG. 1 schematically depicts a system for controlling a telerobot with an input device according to an embodiment of the present disclosure.
FIG. 2 illustrates a method for controlling the telerobot with the input device according to an embodiment of the present disclosure.

FIGS. 1, 2 show a system or method according to an embodiment of the present invention for controlling a telerobot (arm) 1 using an input device, comprising a base 2.1, a control means 3 movable relative to the base 2.1, and an input device controller 2.2, via a robot controller 4 which communicates wirelessly or by a wired connection with the input device controller 2.2. The input device controller 2.2 can be integrated into the base 2.1.

In a step S10, an adjustment of the control means 3 is detected, for example the velocity $\dot{x}_M = v_M$ thereof is measured by means of and relative to the base 2.1.

In addition, in step S10, an external force $F_{ext}$ acting on the telerobot is detected, for example by means of a force-torque sensor 6, or also based on detected loads on joints and/or drives 1.1-1.6 of the telerobot, preferably by means of a mathematical model of the telerobot.

In a step S20, a target adjustment $x_d$ of a reference 5 fixed to the robot is determined from the detected adjustment $\dot{x}_M = v_M$ of the control means 3 by means of a time integration $\int \dot{x}_M dt$ and a projection f, which in particular can also be an identity. Of course, adjustments of the control means can also be mapped to target adjustments of the reference fixed to the robot, in a manner other than identically, for example scaled, in preferred directions or the like.

In addition, in step S20, an actual adjustment x of the reference 5 fixed to the robot is detected, for example based on the positions of the joints or drives 1.1-1.6 and a forward kinematics of the telerobot.

In a step S30, the direction $u_{fe}$ of the detected external force $F_{ext}$ acting on the telerobot, preferably in the general form $$u_{fe} = \frac{F_{ext}}{\|F_{ext}\|}$$

and a rotation matrix $^0R_f$ which produces a rotation about an axis u, which is oriented perpendicularly to the unit vector of the z-axis and perpendicularly to the non-permissible direction $-u_{fe}$, $$u = \underbrace{[0 \quad 0 \quad 1]^T}_{z} \times (-u_{fe})$$

by the angle $$\theta = \cos^{-1} \frac{z \cdot (-u_{fe})}{\|z\| \cdot \|-u_{fe}\|}$$

are determined and the Cartesian errors $\tilde{x} = x - x_d$, $\dot{\tilde{x}} = \dot{x} - \dot{x}_d$ are rotated with this rotation matrix into a coordinate system aligned with the external force, preferably in the general form $$f\bar{x} = {}^{0}R_{f}^{T} \cdot \bar{x}, \quad f\dot{\bar{x}} = {}^{0}R_{f}^{T} \cdot \dot{\bar{x}}$$

Then, the value of the element $k_{3,3}$ of the stiffness matrix $$K_{d} = \begin{bmatrix} k_{1,1} & 0 & 0 \\ 0 & k_{2,2} & 0 \\ 0 & 0 & k_{3,3} \end{bmatrix}$$

for the time step or sample step n is determined as follows:

$$k_{3,3(n)} = \begin{cases} k_{high} \Leftarrow |F_{ext}(n)| < F_{low} \\ k_{low} \Leftarrow |F_{ext}(n)| > F_{high} \\ k_{3,3}(n-1) \Leftarrow F_{low} \le |F_{ext}(n)| \le F_{high} \end{cases}$$

with the constant, specified values $k_{high} > k_{low}$ and $F_{high} > F_{low}$. The specified values of the elements $k_{1,1}$, $k_{2,2}$ of the stiffness matrix, however, remain constant. Then, in a step S40, target drive loads $\tau$ are determined based on a mathematical model of the telerobot, preferably in the general form $$\Lambda(x)\ddot{x}_{d} + \mu(x, \dot{x}) \cdot \dot{x} + F_{g}(x)$$

with the inertia matrix $\Lambda(x)$ of the telerobot, the vector $\mu(x, \dot{x})$ of the gyroscopic or Coriolis and centrifugal loads and the gravitational loads $F_{g}(x)$ in the Cartesian workspace, based on a virtual damper between an actual pose change and a target pose change of the reference fixed to the robot, preferably in the general form $$D_{d} \cdot f\dot{\bar{x}}$$

with the damping matrix $D_{d}$, and by means of a Cartesian impedance regulation, preferably in the general form $$x_{d} = f(x_{M}, v_{M} = \dot{x}_{M}), \quad \dot{x}_{d} = g(x_{M}, v_{M} = \dot{x}_{M}), \quad \bar{x} = x - x_{d}, \quad \dot{\bar{x}} = \dot{x} - \dot{x}_{d}$$

$$\tau = J^{T}(q) \cdot \left(\Lambda(x)\ddot{x}_{d} + \mu(x, \dot{x}) \cdot \dot{x} + F_{g}(x) + K_{d} \cdot f\bar{x} + D_{d} \cdot f\dot{\bar{x}}\right)$$

and the drives are controlled based on these target drive loads, in particular to achieve/exert them, wherein $\ddot{x}_{d}=0$ can be selected for simplification.

It can be seen that, if the external force $F_{ext}$ acting on the telerobot falls below the lower limit value $F_{low}$, a first operating mode is implemented, in which the drives of the telerobot 1 are controlled in such a way that drive loads of the drives increase with an increase in a difference between actual adjustment and target adjustment in order to reduce this difference.

If the external load $F_{ext}$ acting on the telerobot exceeds the upper limit value $F_{high}$, a second operating mode is implemented, in which the drives of the telerobot 1 are likewise controlled in such a way that drive loads of the drives increase with an increase in a difference between actual adjustment and target adjustment in order to reduce this difference. However, the stiffness of a virtual spring in the component corresponding to the external force $F_{ext}$ is reduced compared to the first operating mode so that the drive loads of the drives increase less than in the first operating mode with the same increase in this component of the difference between actual adjustment and target adjustment. In the other, complementary component of the difference, however, the stiffness matrix remains constant so that the drive loads of the drives in the first and second operating modes increase equally here. It can also be seen that a hysteresis is provided between the switching between the two values $k_{high}$, $k_{low}$.

Although exemplary embodiments have been explained in the preceding description, it is pointed out that a large number of modifications is possible.

The exemplary embodiment is explained on the basis of an external force and the z-coordinate, without being limited thereto. On the basis of the above explanations, it is clear to a person skilled in the art that, for example, an external torque and/or other implementations, in particular taking into account the component of the difference that corresponds to the external load, are analogously also possible. For example, for an external torque, a direction and corresponding rotation matrix can be determined analogously and a Cartesian error can be transformed therewith.

It is also pointed out that the exemplary embodiments are merely examples that are not intended to restrict the scope of protection, the applications, and the structure in any way. Rather, the preceding description provides a person skilled in the art with guidelines for implementing at least one exemplary embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Telerobot
1.1-1.6 Drive
2.1 Input device base
2.2 Input device controller
3 Control means
4 Robot controller
5 Reference fixed to the robot
6 Force-torque sensor

What is claimed is:

1. A method for controlling a telerobot using an input device that includes a movable control means, the method comprising:

repeating multiple times:

detecting with a sensor an adjustment of the control means and an external load acting on the telerobot, determining a target adjustment of a telerobot reference fixed to the robot based on the detected adjustment of the control means, detecting an actual adjustment of the telerobot reference, and controlling drives of the telerobot based on a difference between the actual adjustment and the target adjustment;

implementing a first operating mode of the telerobot in response to the detected load being in a first range;

implementing a second operating mode of the telerobot in response to the detected load being in a second range;

wherein the drives of the telerobot are controlled in the first operating mode such that drive loads of the drives increase at a first rate with an increase in a one-dimensional or multi-dimensional first component of the difference between the actual adjustment and the target adjustment in order to reduce the one-dimensional or multi-dimensional first component;

wherein the drives of the telerobot are controlled in the second operating mode such that drive loads of the drives increase at a second rate with the increase in the one-dimensional or multi-dimensional first component of the difference between the actual adjustment and the target adjustment in order to reduce the one-dimensional or multi-dimensional first component, and the second rate is less than the first rate;

controlling the drives of the telerobot in the first operating mode such that drive loads of the drives increase with an increase in at least one one-dimensional or multi-dimensional second component of the difference between the actual adjustment and the target adjustment in order to reduce the second component; and controlling the drives of the telerobot in the second operating mode such that drive loads of the drives increase with the same increase in the second component as in the first operating mode in order to reduce the second component.

2. A method for controlling a telerobot using an input device that includes a movable control means, the method comprising:

repeating multiple times:

detecting with a sensor an adjustment of the control means and an external load acting on the telerobot, determining a target adjustment of a telerobot reference fixed to the robot based on the detected adjustment of the control means, detecting an actual adjustment of the telerobot reference, and controlling drives of the telerobot based on a difference between the actual adjustment and the target adjustment;

implementing a first operating mode of the telerobot in response to the detected load being in a first range;

implementing a second operating mode of the telerobot in response to the detected load being in a second range;

wherein the drives of the telerobot are controlled in the first operating mode such that drive loads of the drives increase at a first rate with an increase in a one-dimensional or multi-dimensional first component of the difference between the actual adjustment and the target adjustment in order to reduce the one-dimensional or multi-dimensional first component;

wherein the drives of the telerobot are controlled in the second operating mode such that drive loads of the drives increase at a second rate with the increase in the one-dimensional or multi-dimensional first component of the difference between the actual adjustment and the target adjustment in order to reduce the one-dimensional or multi-dimensional first component, and the second rate is less than the first rate; and controlling a hysteresis between a transition from the first operating mode to the second operating mode and a transition from the second operating mode to the first operating mode.

3. The method of claim 2, wherein at least one of:

the detected load acts in a direction of the first component; or the direction of the first component at least one of changes with the direction of the detected load or coincides with the direction of the detected load.

4. The method of claim 3, wherein no component of the detected load acts in a direction of a one-dimensional or multi-dimensional second component of the difference between the actual adjustment and the target adjustment.

5. The method of claim 2, wherein at least one of:

the detected load is in the first range if it falls below a lower limit value; or the detected load is in the second range if it exceeds an upper limit value.

6. The method of claim 2, further comprising:

controlling the drives in the first and second operating modes based on a virtual spring between an actual pose and a target pose of the reference fixed to the robot;

wherein a stiffness of the virtual spring in at least one direction is reduced in the second operating mode compared to the first operating mode.

7. The method of claim 6, wherein:

the at least one direction includes a direction of the external load; or the stiffness of the virtual spring is reduced only in the direction of the external load.

8. The method of claim 2, further comprising at least one of:

controlling the drives in the first and second operating modes based on a mathematical model of the telerobot; or controlling the drives in the first and second operating modes based on a virtual damper between an actual pose change and a target pose change of the reference fixed to the robot.

9. The method of claim 2, further comprising controlling the drives by at least one of an impedance control or a passivity control.

10. The method of claim 9 wherein at least one of:

the impedance control is a Cartesian impedance control; or the passivity control is a passivity control in the time domain.

11. A system for controlling a telerobot by means of an input device which comprises a movable control means, the system comprising:

means for determining a target adjustment of a telerobot reference fixed to the robot based on a detected adjustment of the control means; and control means for controlling drives of the telerobot based on a difference between a detected actual adjustment of the reference fixed to the robot and the determined target adjustment, the control means comprising:

means for implementing a first operating mode in response to a detected external load acting on the telerobot being in a first range, and means for implementing a second operating mode in response to the detected external load being in a second range;

wherein the means for implementing the first operating mode comprises means for controlling the drives of the telerobot in the first operating mode such that drive loads of the drives increase at a first rate with an increase in a one-dimensional or multi-dimensional first component of the difference between the actual adjustment and the target adjustment in order to reduce the first component; and wherein the means for implementing the second operating mode comprises means for controlling the drives of the telerobot in the second operating mode such that drive loads of the drives increase at a second rate with the increase in the first component in order to reduce the first component, and the second rate is less than the first rate;

wherein the control means is configured for controlling a hysteresis between a transition from the first operating mode to the second operating mode and a transition from the second operating mode to the first operating mode.

12. A non-transitory computer-readable storage medium storing program code for controlling a telerobot using an input device that includes a movable control device, the program code, when executed by one or more computers, causing the one or more computers to perform the method of claim 2.

\* \* \* \* \*